(12) United States Patent
Kim et al.

(10) Patent No.: US 10,146,181 B2
(45) Date of Patent: Dec. 4, 2018

(54) APPARATUS AND METHOD FOR DISPLAYING HOLOGRAPHIC THREE-DIMENSIONAL IMAGE

(71) Applicant: SAMSUNG ELECTRONICS CO., LTD., Suwon-si (KR)

(72) Inventors: Hojung Kim, Suwon-si (KR); Hoon Song, Yongin-si (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 268 days.

(21) Appl. No.: 14/861,308

(22) Filed: Sep. 22, 2015

(65) Prior Publication Data

US 2016/0085211 A1 Mar. 24, 2016

(30) Foreign Application Priority Data

Sep. 23, 2014 (KR) .................. 10-2014-0127186

(51) Int. Cl.
| | | |
|---|---|---|
| H04N 13/04 | (2006.01) | |
| G03H 1/22 | (2006.01) | |
| G03H 1/08 | (2006.01) | |

(52) U.S. Cl.
CPC ......... *G03H 1/2294* (2013.01); *G03H 1/0808* (2013.01); *G03H 2210/30* (2013.01); *G03H 2210/441* (2013.01); *G03H 2210/45* (2013.01); *G03H 2210/452* (2013.01); *G03H 2210/454* (2013.01); *G03H 2240/56* (2013.01)

(58) Field of Classification Search
None
See application file for complete search history.

(56) References Cited

U.S. PATENT DOCUMENTS

| | | | | |
|---|---|---|---|---|
| 5,400,155 A | * | 3/1995 | Ueda | G03H 1/08 359/21 |
| 6,621,605 B1 | * | 9/2003 | Grossetie | G03H 1/08 359/22 |
| 7,636,184 B2 | | 12/2009 | Schwerdtner | |
| RE43,088 E | | 1/2012 | Levenets | |
| 2006/0139711 A1 | * | 6/2006 | Leister | G03H 1/2294 359/9 |
| 2008/0084592 A1 | * | 4/2008 | Boden | G03H 1/0011 359/2 |
| 2008/0246759 A1 | | 10/2008 | Summers | |
| 2010/0149139 A1 | * | 6/2010 | Kroll | G02B 26/0875 345/204 |
| 2013/0022222 A1 | * | 1/2013 | Zschau | G03H 1/0808 381/306 |

(Continued)

FOREIGN PATENT DOCUMENTS

| | | |
|---|---|---|
| KR | 10-2013-0046535 A | 5/2013 |
| KR | 10-2014-0037301 A | 3/2014 |
| KR | 10-1378910 B1 | 3/2014 |

*Primary Examiner* — Janese Duley
(74) *Attorney, Agent, or Firm* — Sughrue Mion, PLLC

(57) ABSTRACT

Provided are an apparatus and a method for displaying a holographic three-dimensional (3D) image. The apparatus includes an image segmenter configured to segment an original image into a plurality of segments, and a calculator configured to calculate diffraction fringe pattern information for displaying each of the plurality of segments as a 3D holographic image. The image segmenter adjusts the number of the plurality of segments.

18 Claims, 9 Drawing Sheets

(56) References Cited

U.S. PATENT DOCUMENTS

| | | | | |
|---|---|---|---|---|
| 2014/0146133 A1* | 5/2014 | Nikonov | .............. | G03H 1/2294 348/40 |
| 2014/0355086 A1* | 12/2014 | Sugiyama | ............ | G03H 1/2294 359/9 |
| 2015/0309472 A1* | 10/2015 | Takiguchi | .............. | G02B 26/06 359/9 |

* cited by examiner

APPARATUS AND METHOD FOR DISPLAYING HOLOGRAPHIC THREE-DIMENSIONAL IMAGE

RELATED APPLICATION

This application claims priority from Korean Patent Application No. 10-2014-0127186, filed on Sep. 23, 2014, in the Korean Intellectual Property Office, the disclosure of which is incorporated herein in its entirety by reference.

BACKGROUND

1. Field

Apparatuses and methods consistent with exemplary embodiments relate to displaying holographic three-dimensional (3D) images.

2. Description of the Related Art

A hologram system is a stereoscopic visual system that can accurately reproduce an original 3D stereoscopic image in space. Many people consider a hologram service as the final goal of 3D stereoscopic video processing technology. The hologram system may provide natural image representation with unlimited observation positions by representing depths so that an observation may be made from any viewpoint in a predetermined range. Since holographic images may be viewed as natural images without the need to wear glasses, various problems of 3D images may be eliminated.

Holographic service types are expected to diversify, and holographic technologies are predicted to be available in various application fields. Examples of the application fields include advertisement, video communication, video conference, broadcast services, education, simulation, and military training. Also, in the case of home shopping, product selection may be facilitated by displaying real product images that are the same size as their respective products.

A complex spatial light modulator (SLM) capable of simultaneously controlling the amplitude and phase of a light is used to implement the holographic technologies. The SLM may implement a 3D image by modulating the amplitude and phase of an incident light according to the type of a 3D object.

The SLM forms a diffraction fringe pattern corresponding to a 3D image in order to modulate the amplitude and phase of a light. However, a large amount of information processing is required to form the diffraction fringe pattern. Due to such a large calculation amount, the holographic technologies have much difficulty in providing 3D images.

SUMMARY

One or more exemplary embodiments provide apparatuses and methods for displaying holographic three-dimensional (3D) images.

Additional aspects will be set forth in part in the description which follows and, in part, will be apparent from the description, or may be learned by practice of the presented exemplary embodiments.

According to an aspect of an exemplary embodiment, an apparatus for displaying a holographic 3D image includes: an image segmenter configured to segment an original image into a plurality of segments, and adjust a number of the segments per unit volume or the number of the segments per unit area; a calculator configured to calculate diffraction fringe pattern information for displaying each of the plurality of segments as a 3D holographic image; and a light modulator configured to form a diffraction fringe pattern according to the diffraction fringe pattern information and generate the 3D holographic image corresponding to the original image by modulating a light incident on the diffraction fringe pattern.

The image segmenter may be further configured to adjust the number of the segments according to at least one selected from a shape of an object included in the original image, a position of the object included in the original image, and a property of a light representing the original image.

The property of the light representing the original image may include at least one selected from a brightness of the light and a wavelength of the light.

The image segmenter may be further configured to segment the original image by using at least one selected from a mode of segmenting the original image into a plurality of layers according to a depth of the original image, a mode of segmenting the original image into a plurality of points, and a mode of segmenting a surface of the object included in the original image into a plurality of polygons.

The image segmenter may be further configured to segment the original image of the object according to at least one selected from a curvature radius of a surface of the object and a change rate of the curvature radius of the surface.

The image segmenter may include information about a reference number of the segments according to the curvature radius or the change rate of the curvature radius, and may be further configured to set the number of the segments per unit volume or the number of the segments per unit area to be less than the reference number in a region having the large curvature radius or a region having the small change rate of the curvature radius.

The image segmenter may include information about a reference thickness of the segments according to the curvature radius or the change rate of the curvature radius, and may be further configured to segment the original image into a plurality of layers according to depth, and set a thickness of each of the plurality of layers to be greater than the reference thickness in a region having the large curvature radius or a region having the small change rate of the curvature radius.

The image segmenter may include information about a reference volume or a reference area of the segments according to the curvature radius or the change rate of the curvature radius, and may be further configured to segment the original image into a plurality of points, and set a volume or an area covered by each of the plurality of points to be greater than the reference volume or the reference area in a region having the large curvature radius or a region having the small change rate of the curvature radius.

The image segmenter may include information about a reference area of the segments according to the curvature radius or the change rate of the curvature radius, and may be further configured to segment the surface of the object into a plurality of polygons, and set an area of each of the plurality of polygons to be greater than the reference area in a region having the large curvature radius or a region having the small change rate of the curvature radius.

The image segmenter may include information about a reference number of the segments related to a region of the original image represented by a light having a visible wavelength, and may be further configured to set the number of the segments per unit volume or the number of the segments per unit area in the region of the original image represented by light having a visible wavelength to be greater than the number of the segments per unit volume or the number of the segments per unit area in a region of the original image represented by a light having an invisible wavelength.

The image segmenter may include information about a reference number of the segments related to the brightness of the original image, and may be further configured to set the number of the segments per unit volume or the number of the segments per unit area in a bright region of the original image to be greater than the number of the segments per unit volume or the number of the segments per unit area in a dark region of the original image.

The image segmenter may include information about a reference number of the segments related to a visible region of the original image, and may be further configured to set the number of the segments per unit volume or the number of the segments per unit area in the visible region of the original image to be greater than the number of the segments per unit volume or the number of the segments per unit area in an invisible region of the original image.

The image segmenter may include information about a reference number of the segments according to a depth of the original image, and may be further configured to set the number of the segments per unit volume or the number of the segments per unit area in a shallow region of the original image to be greater than the number of the segments per unit volume or the number of the segments per unit area in a deep region of the original image.

The image segmenter may include information about a reference thickness of the segments according to a depth of the original image, and may be further configured to segment the original image into a plurality of layers according to the depth, while setting a thickness of each of the plurality of layers to be greater than the reference thickness in a deep region of the original image.

According to an aspect of another exemplary embodiment, a method for displaying a holographic 3D image includes: segmenting an original image into a plurality of segments, while adjusting a number of the segments per unit volume or the number of the segments per unit area; calculating diffraction fringe pattern information for displaying each of the plurality of segments as a 3D holographic image; and forming a diffraction fringe pattern according to the diffraction fringe pattern information and generating the 3D holographic image corresponding to the original image by modulating a light incident on the diffraction fringe pattern.

The segmenting of the original image may include adjusting the number of the segments according to at least one selected from a shape of an object included in the original image, a position of the object included in the original image and a property of a light representing the original image.

The property of the light representing the original image may include at least one selected from a brightness of the light and a wavelength of the light.

The method may include segmenting the original image by using at least one selected from a mode of segmenting the original image into a plurality of layers according to depth, a mode of segmenting the original image into a plurality of points, and a mode of segmenting a surface of an object included in the original image into a plurality of polygons.

The method may include segmenting an image of an object included in the original image according to at least one selected from a curvature radius of a surface of the object and a change rate of the curvature radius of the surface.

The segmenting of the original image may include: storing information about a reference number of the segments according to the curvature radius or the change rate of the curvature radius; and setting the number of the segments per unit volume or the number of the segments per unit area to be less than the reference number in a region having the large curvature radius or a region having the small change rate of the curvature radius.

The segmenting of the original image may include: storing information about a reference thickness of the segments according to the curvature radius or the change rate of the curvature radius; and segmenting the original image into a plurality of layers according to depth, while setting a thickness of each of the plurality of layers to be larger than the reference thickness in a region having the large curvature radius or a region having the small change rate of the curvature radius.

The segmenting of the original image may include: storing information about a reference number of the segments related to a region of the original image represented by a light having a visible wavelength; and setting the number of the segments per unit volume or the number of the segments per unit area in the region of the original image represented by light having a visible wavelength to be larger than the number of the segments per unit volume or the number of the segments per unit area in a region of the original image represented by a light having an invisible wavelength.

The segmenting of the original image may include: storing information about a reference number of the segments related to a brightness of the original image; and setting the number of the segments per unit volume or the number of the segments per unit area in a bright region of the original image to be larger than the number of the segments per unit volume or the number of the segments per unit area in a dark region of the original image.

The segmenting of the original image may include: storing information about a reference number of the segments related to a visible region of the original image; and setting the number of the segments per unit volume or the number of the segments per unit area in the visible region of the original image to be larger than the number of the segments per unit volume or the number of the segments per unit area in an invisible region of the original image.

The segmenting of the original image may include: storing information about a reference number of the segments according to a depth of the original image; and setting the number of the segments per unit volume or the number of the segments per unit area in a shallow region of the original image to be larger than the number of the segments per unit volume or the number of the segments per unit area in a deep region of the original image.

The segmenting of the original image may include: storing information about a reference thickness of the segments according to a depth of the original image; and segmenting the original image into a plurality of layers according to the depth, while setting a thickness of each of the plurality of layers to be larger than the reference thickness in a deep region of the original image.

According to an aspect of another exemplary embodiment, a holographic three-dimensional display method includes: inputting an original image of an object; dividing the original image into a plurality of segments, wherein a number of segments per unit area or the number of segments per unit volume is proportional to a change rate of a curvature of the object; and displaying each of the plurality of segments as a 3D holographic image.

The plurality of segments may include at least one of a plurality of layers, a plurality of points, and a plurality of polygons.

The plurality of segments may include a plurality of layers, wherein each layer has a thickness according to a complexity of a shape of the object.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
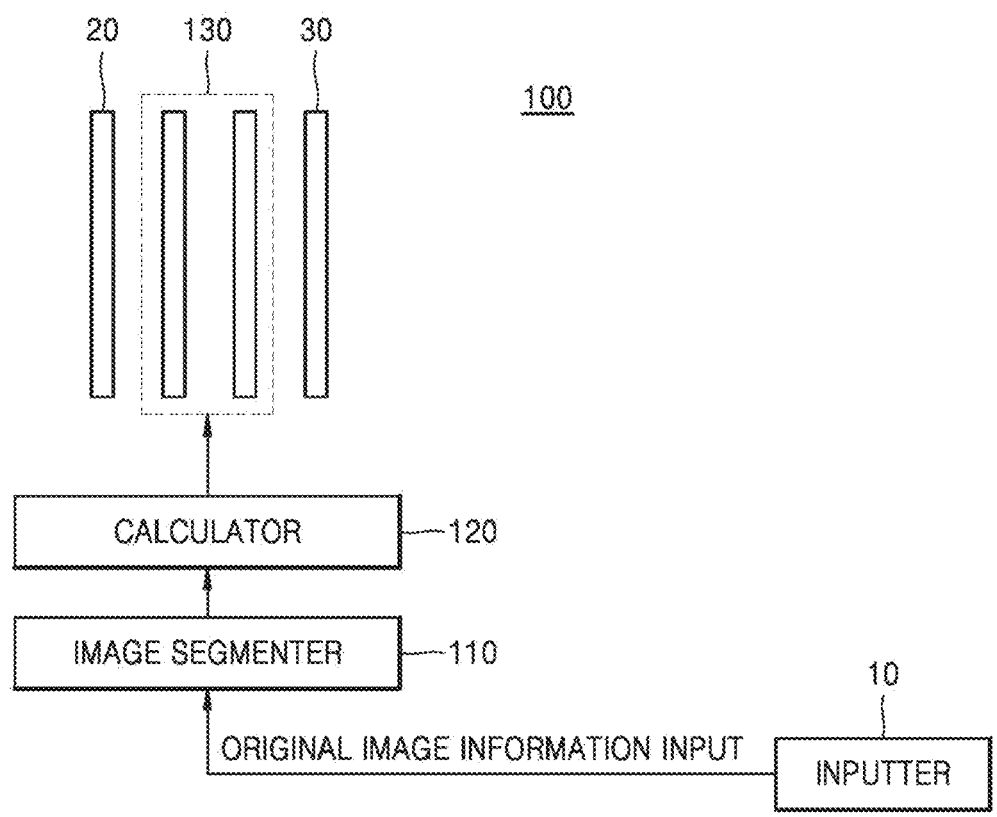
FIG. 1 is a block diagram of a holographic three-dimensional (3D) image displaying apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, holographic three-dimensional (3D) image displaying apparatuses and methods according to exemplary embodiments will be described in detail with reference to the accompanying drawings.

FIG. 1 is a block diagram of a holographic 3D image displaying apparatus 100 according to an exemplary embodiment.

Referring to FIG. 1, the holographic 3D image displaying apparatus 100 according to an exemplary embodiment may include an image segmenting unit, i.e., image segmenter, 110 configured to segment an original image into a plurality of segments, and a calculating unit, i.e. calculator, 120 configured to calculate diffraction fringe pattern information for displaying each of the plurality of segments as a 3D holographic image. Also, the holographic 3D image displaying apparatus 100 may include a light modulator 130 configured to form a diffraction fringe pattern on the basis of the diffraction fringe pattern information and generate a holographic 3D image corresponding to the original image by modulating a light incident on the diffraction fringe pattern. The image segmenting unit 110 may segment the original image, while adjusting the number of the segments per unit volume or the number of the segments per unit area differently.

The image segmenting unit 110 may receive an input of original image information. For example, as illustrated in FIG. 1, the image segmenting unit 110 may receive an input of the original image information from an input unit 10. As an example, the input unit 10 may be included in the holographic 3D image displaying apparatus 100. As another example, the input unit 10 may be separated from the holographic 3D image displaying apparatus 100. Information about the original image to be reproduced may be input through the input unit 10. As an example, the original image may be a pre-recorded image. As another example, the original image may be a virtually produced image such as an animation image. The holographic 3D image displaying apparatus 100 may generate a holographic 3D image from the original image.

Figure 2:
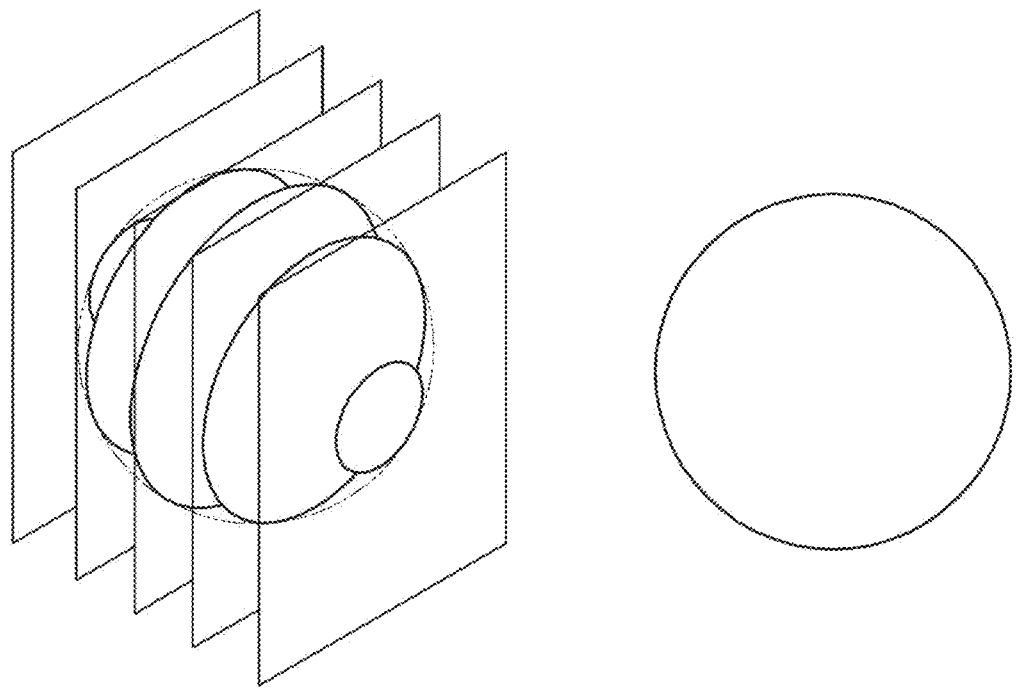
FIGS. 2 to 4 are diagrams illustrating an example in which an image segmenter segments an original image.
Figure 3:
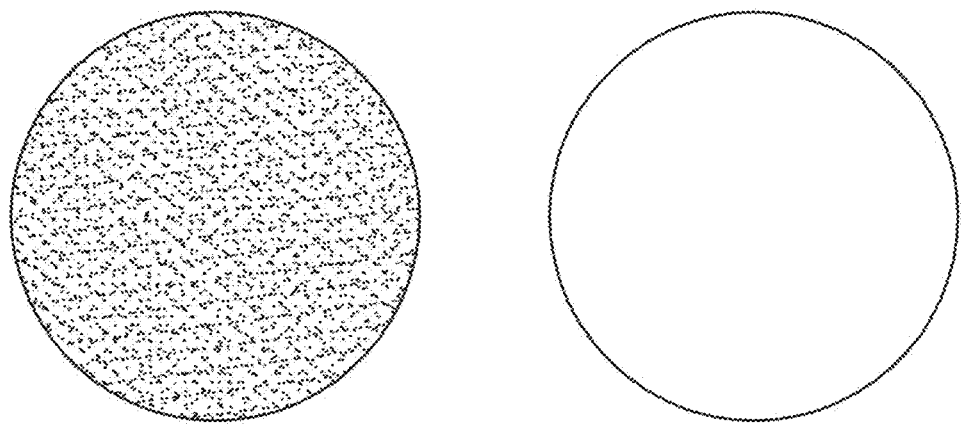
Figure 4:
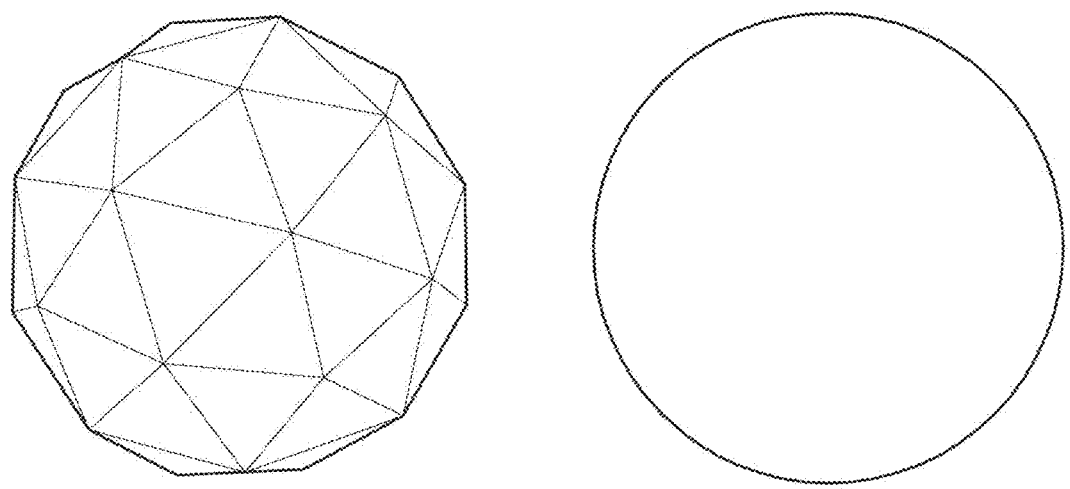

The image segmenting unit 110 may segment the original image into a plurality of segments. FIGS. 2 to 4 are diagrams illustrating an example in which the image segmenting unit 110 segments the original image.

Referring to FIG. 2, the original image may be segmented into a plurality of layers according to depth. The depth may be coordinates representing the perspective of the original image. That is, when a region is deep, a viewer may feel that the region is distant from the viewer. The depth may be set to increase away from the viewer from a reference plane. The reference plane may be any plane located in front of the viewer. Referring to FIG. 3, the original image may be segmented into a plurality of points. Objects included in the original image may be represented by a plurality of points. The volumes or areas covered by each of the plurality of points may vary from point to point. Referring to FIG. 4, a surface of an object included in the original image may be segmented into a plurality of polygons. The polygon may have n sides (where n may be a natural number greater than or equal to 3). The shape and size of the polygon may vary from object to object. Also, the shape and size of the polygon may vary from region to region within the same object. The segmentation modes illustrated in FIGS. 2 to 4 are merely exemplary, and exemplary embodiments are not limited thereto. For example, the image segmenting unit 110 may segment the original image according to any combination of the segmentation modes illustrated in FIGS. 2 to 4 or any other segmentation mode.

As the number of the segments increases, the resolution of the holographic 3D image may increase. However, as the number of the segments increases, the calculation time and processing power of the calculating unit 120 may increase. Consequently, the time taken to generate the holographic 3D image may increase. Thus, the image segmenting unit 110 may properly adjust the number of the segments in the original image whenever necessary. To this end, the image segmenting unit 110 may adjust the number of segments per unit volume according to at least one of a shape and a position of an object included in the original image and a property of a light representing the original image.

In consideration of the shape of the object, the image segmenting unit 110 may segment an image of the object differently according to at least one of a curvature radius of a surface of the object and a change rate of the curvature radius of the surface. The image segmenting unit 110 may determine that the shape of the object is not complex in a region having a large curvature radius or a region having a small change rate of the curvature radius. Also, the image segmenting unit 110 may determine that the resolution of the holographic 3D image may be reduced in a region where the shape of the object is not complex. The image segmenting unit 110 may include information about the reference number of the segments according to the curvature radius or the change rate of the curvature radius. Herein, the reference number may refer to the number of segments per unit volume or the number of segments per unit area in a case where the curvature radius or the change rate of the curvature radius has a predetermined standard value or average value. The information about the reference number may be pre-stored in the image segmenting unit 110. The image segmenting unit 110 may set the number of the segments per unit volume or the number of the segments per unit area to be less than the reference number in a region having a curvature radius larger than the predetermined standard value or a region having a change rate of the curvature radius smaller than the predetermined standard value. In other words the number of segments per unit volume or the number of segments per unit area is proportional to the change rate of the curvature radius.

Figure 5:
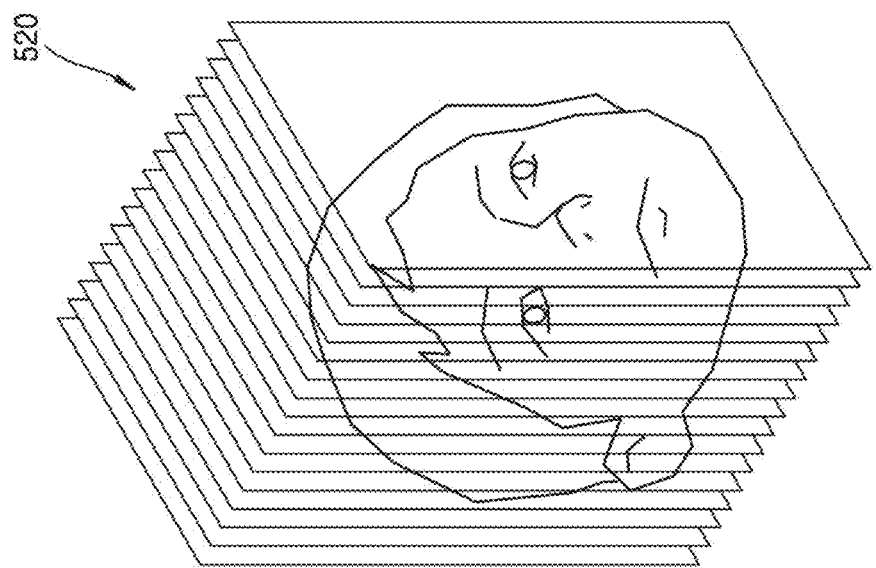
FIGS. 5 to 7 are diagrams illustrating an example of segmenting a 3D original image differently according to the shape of an object.
Figure 5:
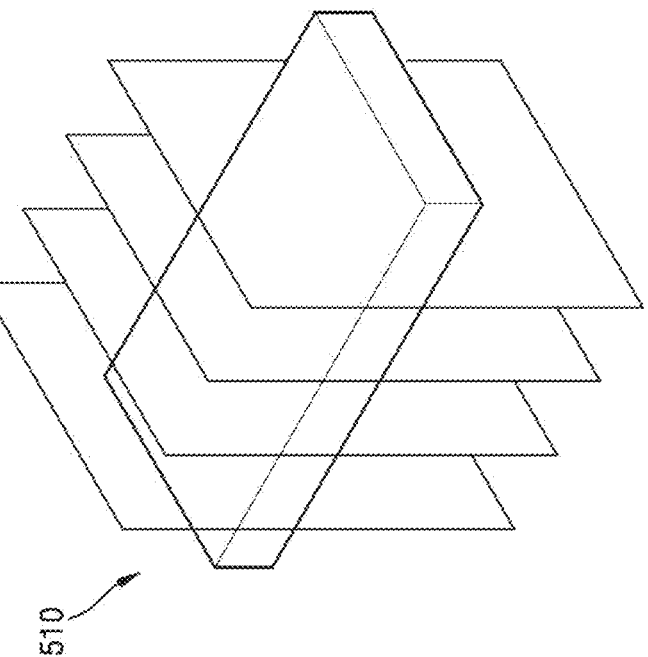
Figure 6:
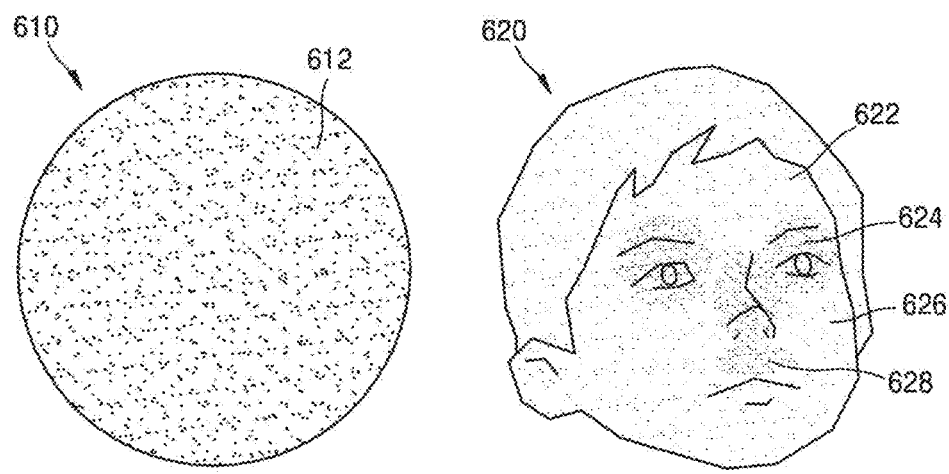
Figure 7:
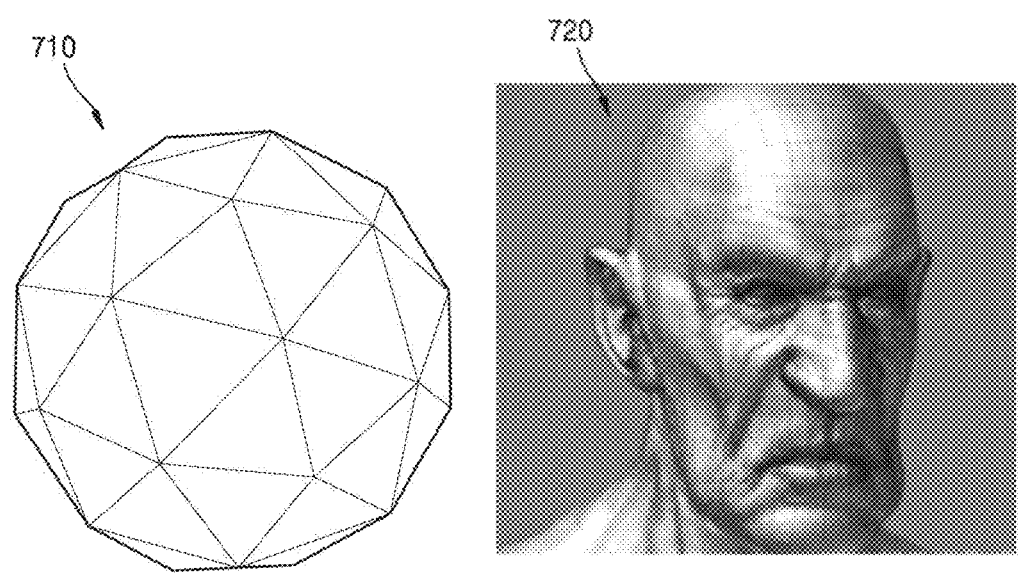

FIGS. 5 to 7 are diagrams illustrating an example of segmenting an original image differently according to the shape of an object.

FIG. 5 illustrates an example in which the thickness of each of the plurality of layers varies from a first object 510 having the shape of a rectangular parallelepiped to a second object 520 having the shape of a human face. Referring to FIG. 5, the image segmenting unit 110 may segment the original image into a plurality of layers according to the depth. Also, the image segmenting unit 110 may include information about a reference thickness of the segments according to the curvature radius or the change rate of the curvature radius. Herein, the reference thickness may refer to the number of the segments per unit volume or the number of the segments per unit area in the case where the curvature radius or the change rate of the curvature radius has a predetermined standard value. The information about the reference thickness may be pre-stored in the image segmenting unit 110. The image segmenting unit 110 may set a thickness of each of the plurality of layers to be greater than the reference thickness in a region having a curvature radius greater than the predetermined standard value or a region having a change rate of the curvature radius smaller than a predetermined standard value.

Each surface of the first object 510 having the shape of a rectangular parallelepiped illustrated in FIG. 5 has a large curvature radius approaching infinity. Also, except for an edge portion, the first object 510 has little change in the curvature radius of the surface. Thus, each of the plurality of layers in the first object 510 may have a relatively large thickness. The second object 520 having the shape of a human face has a small curvature radius and a large curvature radius change rate at each point. Thus, in comparison with the first object 510, each of the plurality of layers in the second object 520 may have a relatively small thickness. That is, the thickness of each of the plurality of layers in each object may vary according to the complexity of the shape of the object. Also, in the same object, the thickness of each of the plurality of layers may be smaller in a region having a more complex shape, that is, a region having a smaller curvature radius or a greater change rate of the curvature radius. For example, in the second object 520, the thickness of each of the plurality of layers may be smaller in a region having a more complex shape than in other regions.

FIG. 6 illustrates an example in which the volume or area covered by each of a plurality of points varies from a first object 610 having a spherical shape to a second object 620 having the shape of a human face. Referring to FIG. 6, the image segmenting unit 110 may segment the original image into a plurality of points. The image segmenting unit 110 may include information about the reference volume or the reference area of the segments according to the curvature radius or the change rate of the curvature radius. Also, the image segmenting unit 110 may set a volume or an area covered by each of the plurality of points to be greater than the reference volume or the reference area in a region having a large curvature radius or a region having a small change rate of the curvature radius. Herein, the reference volume or the reference area may be information about the volume or the area of the segments in the case where the curvature radius or the change rate of the curvature radius has a predetermined standard value. The information about the reference volume or the reference area may be pre-stored in the image segmenting unit 110.

The curvature radius of the first object 610 having a spherical shape illustrated in FIG. 6 does not change. That is, the change rate of the curvature radius of the first object 610 is 0. Thus, the image segmenting unit 110 may determine that the shape 612 of the first object 610 is not complex, and then reduce the number of points representing the first object 610. The image segmenting unit 110 may set the volume or the area covered by each of the plurality of points to be relatively large in the first object 610.

The image segmenting unit 110 may set the volume or the area covered by each of the plurality of points to be relatively small in the second object 620. Also, in the second object 620, the volume or the area covered by each of the plurality of points may be smaller in a region having a more complex shape, such as an eye 624 or a nose 628. On the other hand, the volume or the area covered by each of the plurality of points may be relatively large in a region having a relatively simple shape, such as a forehead 622 or a cheek 626.

FIG. 7 illustrates an example in which the area of the polygon varies from a first object 710 having a spherical shape to a second object 720 having the shape of a human face. Referring to FIG. 7, the image segmenting unit 110 may segment the surface of the object into a plurality of polygons. The image segmenting unit 110 may include information about a reference area of the segments according to the curvature radius or the change rate of the curvature radius, and set the area of the polygon to be greater than the reference area in a region having a large curvature radius or a region having a small change rate of the curvature radius. Herein, the reference area may be information about the area of the segments in the case where the curvature radius or the change rate of the curvature radius has a predetermined standard value. Also, the information about the area of the segments may be information about the area of the polygon. The information about the reference area may be pre-stored in the image segmenting unit 110.

The image segmenting unit 110 may set the area of the polygon to be greater than the reference area in a region having a large curvature radius or a region having a small change rate of the curvature radius. The reference area may be the area of the polygon in the case where the shape of the object is not considered. The curvature radius of the first object 710 having a spherical shape illustrated in FIG. 7 does not change. That is, the change rate of the curvature radius of the first object 710 is 0. Thus, the image segmenting unit 110 may reduce the number of polygons into which the surface of the first object 710 is segmented. On the other hand, the image segmenting unit 110 may increase the number of polygons into which the surface of the second object 720 is segmented. Also, in the second object 720, the area of the polygon may be smaller in a region having a more complex shape, such as an eye or a nose.

With reference to FIGS. 5 to 7, it has been described that the operation of the image segmenting unit 110 varies according to a shape of the object included in the original image. The image segmenting unit 110 may also set the number of segments per unit volume or the number of segments per unit area differently according to a property of the light representing the original image. The property of the light may include the brightness of the light and/or the wavelength of the light. For example, a region in the original image may be represented by a light having an invisible wavelength. Since the region might not be recognized well by the viewer, the resolution of the region does not need to be increased. Thus, the image segmenting unit 110 may include information about the reference number of the segments related to a region of the original image represented by light having a visible wavelength, and set the number of segments per unit volume or the number of segments per unit area in the region of the original image represented by light having a visible wavelength to be greater than the number of segments per unit volume or the number of segments per unit area in a region of the original image represented by light having an invisible wavelength. The reference number of the segments related to the region represented by light having a visible wavelength may be pre-stored in the image segmenting unit 110.

Figure 8:
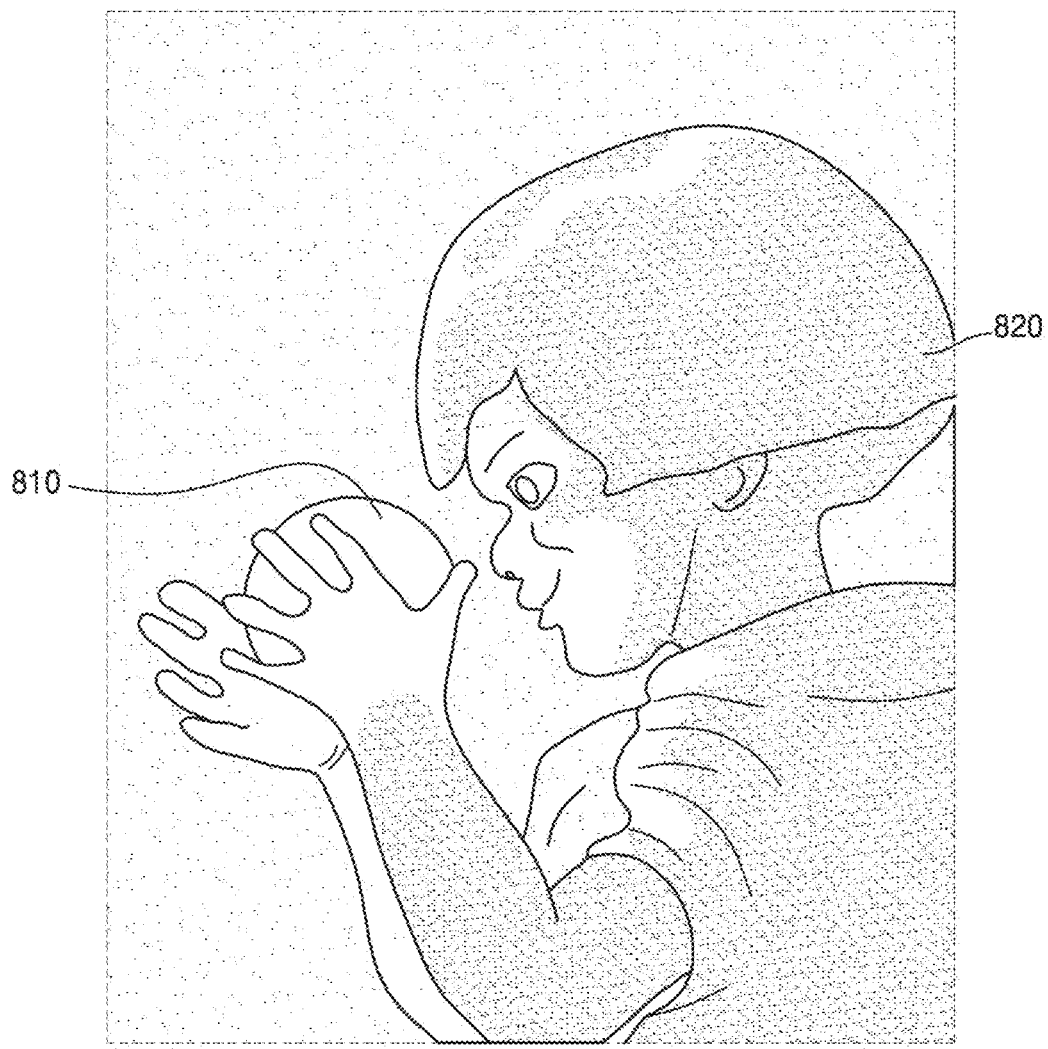
FIG. 8 is a diagram illustrating an example in which brightness varies in an original image.

FIG. 8 is a diagram illustrating an example in which brightness varies in an original image.

Referring to FIG. 8, the original image may include a bright region 810 and a dark region 820. Since the dark region 820 is not well recognized by the viewer, the resolution of the dark region 820 need not be increased. Thus, the image segmenting unit 110 may include information about a reference number of the segments related to the brightness of the original image, and set the number of segments per unit volume or the number of segments per unit area in a bright region of the original image to be greater than the number of segments per unit volume or the number of segments per unit area in a dark region of the original image. Herein, the reference number may refer to the number of segments per unit volume or the number of segments per unit area in the case where the brightness of the original image has a predetermined standard value. The information about the reference number may be pre-stored in the image segmenting unit 110.

Figure 9:
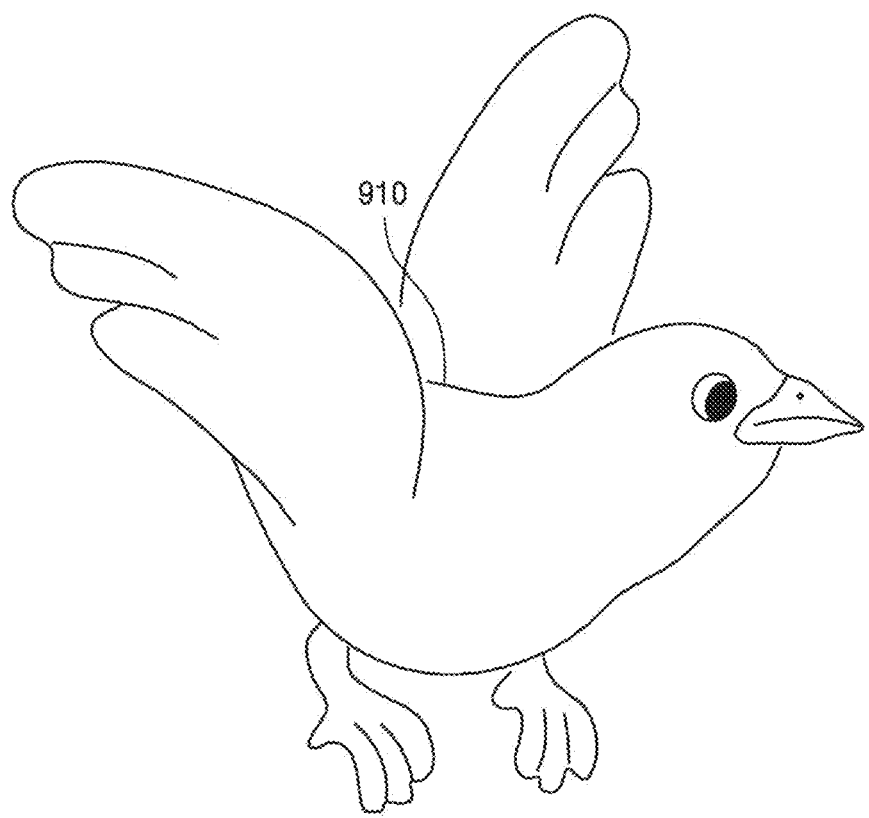
FIG. 9 is a diagram illustrating an example of an object appearing in an original image.

FIG. 9 is a diagram illustrating an example of an object appearing in an original image.

Referring to FIG. 9, an object having the shape of a bird appears in the original image. In this case, a rear back region 910 of the bird is covered by a wing and faces the back side. Thus, the rear back region 910 of the bird is an invisible region that is invisible to the viewer. The image segmenting unit 110 may determine that the resolution of the invisible region need not be increased. Thus, the image segmenting unit 110 may include information about a reference number of the segments related to a visible region of the original image, and set the number of segments per unit volume or the number of segments per unit area in the visible region of the original image to be greater than the number of segments per unit volume or the number of segments per unit area in an invisible region of the original image. The reference number of the segments related to the visible region may refer to the number of segments per unit volume or the number of segments per unit area in the case where the original image is generally visible to the viewer.

The image segmenting unit 110 may segment the original image into a plurality of segments in consideration of the depth. For example, the viewer may feel that a deep region is distant from the viewer. Thus, the image segmenting unit 110 may determine that the resolution of the deep region may be relatively reduced. Also, the image segmenting unit 110 may include information about a reference number of the segments according to a depth of the original image, and set the number of segments per unit volume or the number of segments per unit area in a shallow region of the original image to be greater than the number of segments per unit volume or the number of segments per unit area in a deep region of the original image. The reference number of the segments according to the depth may refer to the number of the segments in the case where the depth has an average value in the original image. The reference number of segments according to the depth may be pre-stored in the image segmenting unit 110.

Figure 10:
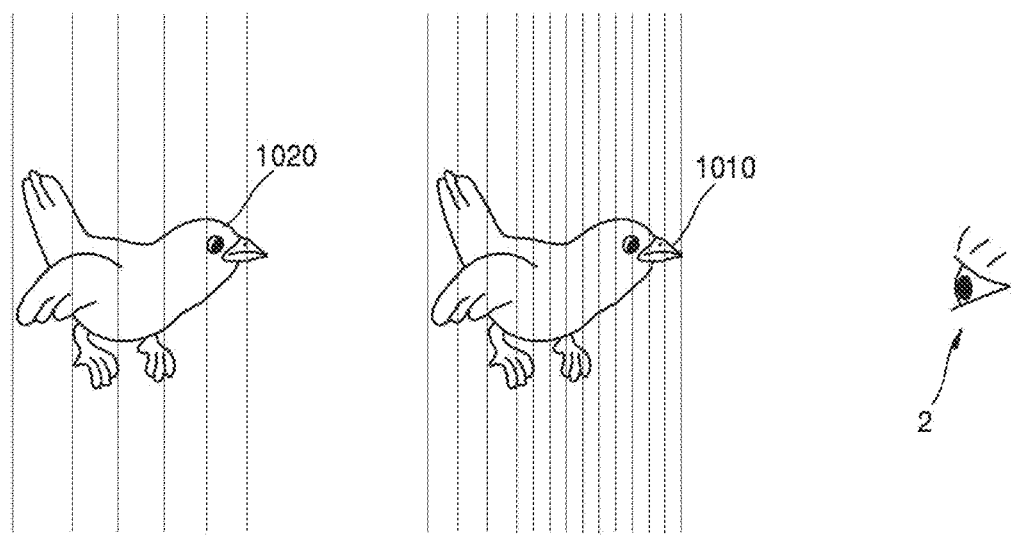
FIG. 10 is a diagram illustrating an example of segmenting a 3D original image according to depth.

FIG. 10 is a diagram illustrating an example of segmenting a 3D original image according to depth.

Referring to FIG. 10, in the original image, a first object 1010 may be present in a shallow region and a second object 1020 may be present in a deep region. A viewer 2 may feel that the first object 1010 is close to the viewer 2 and that the second object 1020 is distant from the viewer 2. The image segmenting unit 110 may segment the original image into a plurality of layers according to the depth. Also, the image segmenting unit 110 may set the thickness of each of the plurality of layers to be greater than a reference thickness in a deep region of the original image. Thus, the second object 1020 in the deep region may be segmented into a smaller number of segments. Accordingly, the calculation amount of the calculating unit 120 may be reduced.

When the image segmenting unit 110 segments the original image into a plurality of segments, the calculating unit 120 may calculate diffraction fringe pattern information for displaying each of the plurality of segments as a holographic image. The calculating unit 120 may apply various algorithms to calculate the diffraction fringe pattern information. For example, when the image segmenting unit 110 segments the original image into a plurality of layers according to the depth, the calculating unit 120 may the calculate diffraction fringe pattern information corresponding to each segment by Fresnel transformation. Also, when the image segmenting unit 110 segments the original image into a plurality of points, the calculating unit 120 may calculate the diffraction fringe pattern information corresponding to each segment by using the sum of a point spread function (PSF). Also, when the image segmenting unit 110 segments the surface of the object into a plurality of polygons, the calculating unit 120 may calculate the diffraction fringe pattern information by calculating each spectrum.

When the calculating unit 120 calculates the diffraction fringe pattern information, the light modulator 130 may form a diffraction fringe pattern corresponding to the diffraction fringe pattern information. Also, the light modulator 130 may generate a holographic 3D image corresponding to the original image by modulating a light incident on the diffraction fringe pattern. FIG. 1 illustrates an example in which the light modulator 130 includes two diffraction fringe pattern layers. However, this is merely exemplary, and the light modulator 130 may include one diffraction fringe pattern layer or three or more diffraction fringe pattern layers. The light modulator 130 modulates a light that is incident from a backlight unit 20. In the modulation process, the light modulator 130 may control the intensity, color, and/or phase of the incident light. To this end, the light modulator 130 may include a matrix of a plurality of controllable pixels. The light modulator 130 may be of a transmission type or a reflection type. Although the light modulator 130 is illustrated as being of a transmission type, exemplary embodiments are not limited thereto. A transmission-type spatial light modulator (SLM) may be, for example, a modulator in which liquid crystal cells or electro-wetting cells are arrayed on a transparent substrate. A reflection-type SLM may be, for example, a liquid crystal on silicon (LCOS) element.

The light modulated by the light modulator 130 may pass through an active optical element 30. The active optical element 30 may control the propagation direction of the light modulated by the light modulator 130. Accordingly, the active optical element 30 may increase the viewing angle of the holographic 3D image displaying apparatus 100.

The holographic 3D image displaying apparatus 100 according to an exemplary embodiment has been described above with reference to FIGS. 1 to 10. A holographic 3D image displaying method using the holographic 3D image displaying apparatus 100 will be described below.

Figure 11:
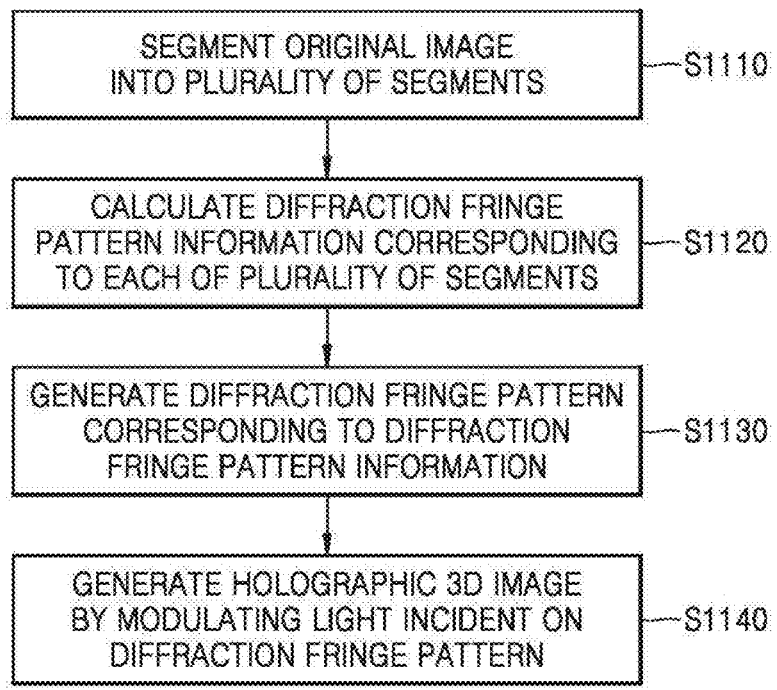
FIG. 11 is a flowchart of a holographic 3D image displaying method according to an exemplary embodiment.

FIG. 11 is a flowchart of a holographic 3D image displaying method 1100 according to an exemplary embodiment.

Referring to FIG. 11, the holographic 3D image displaying method 1100 may include: an operation S1110 of segmenting an original image into a plurality of segments, while adjusting the number of segments per unit volume or the number of segments per unit area accordingly; an operation S1120 of calculating diffraction fringe pattern information for displaying each of the plurality of segments as a 3D holographic image; an operation S1130 of generating a diffraction fringe pattern on the basis of the diffraction fringe pattern information; and an operation S1140 of generating a holographic 3D image corresponding to the original image by modulating a light incident on the diffraction fringe pattern.

The operation S1110 of segmenting the original image may include adjusting the number of segments according to at least one of a shape and a position of an object included in the original image and a property of a light representing the original image. The property of the light representing the original image may include at least one of a brightness of the light and a wavelength of the light.

The operation S1110 of segmenting the original image may include segmenting the original image by using at least one of a mode of segmenting the original image into a plurality of layers according to depth, a mode of segmenting the original image into a plurality of points, and a mode of segmenting a surface of the object into a plurality of polygons.

The operation S1110 of segmenting the original image may include segmenting an image of the object according to at least one of a curvature radius of a surface of the object and a change rate of the curvature radius of the surface. The operation S1110 of segmenting the original image may include: storing information about the reference number of the segments according to the curvature radius or the change rate of the curvature radius; and setting the number of segments per unit volume or the number of segments per unit area to be smaller than the reference number in a region having the large curvature radius or a region having the small change rate of the curvature radius.

The operation S1110 of segmenting the original image may include: storing information about a reference thickness of the segments according to the curvature radius or the change rate of the curvature radius; and segmenting the original image into a plurality of layers according to the depth, while setting the thickness of each of the plurality of layers to be greater than the reference thickness in a region having the large curvature radius or a region having the small change rate of the curvature radius.

The operation S1110 of segmenting the original image may include: storing information about the reference number of the segments related to a region of the original image represented by a light having a visible wavelength; and setting the number of the segments per unit volume or the number of the segments per unit area to be greater than the reference number in a region of the original image represented by a light having an invisible wavelength.

The operation S1110 of segmenting the original image may include: storing information about the reference number of the segments related to the brightness of the original image; and setting the number of segments per unit volume or the number of segments per unit area to be greater than the reference number in a dark region of the original image.

The operation S1110 of segmenting the original image may include: storing information about the reference number of the segments related to a visible region of the original image; and setting the number of segments per unit volume or the number of segments per unit area to be greater than the reference number in an invisible region of the original image.

The operation S1110 of segmenting the original image may include: storing information about the reference number of segments according to the depth of the original image; and setting the number of segments per unit volume or the number of the segments per unit area to be greater than the reference number in a deep region of the original image.

The operation S1110 of segmenting the original image may include: storing information about a reference thickness of the segments according to the depth of the original image; and segmenting the original image into a plurality of layers according to the depth, while setting the thickness of each of the plurality of layers to be greater than the reference thickness in a deep region of the original image.

The holographic 3D image displaying apparatuses and methods according to exemplary embodiments have been described above with reference to FIGS. 1 to 11. As described above, according to one or more exemplary embodiments, the holographic 3D image displaying apparatuses and methods may segment the original image into a plurality of segments. The holographic 3D image displaying apparatuses and methods according to exemplary embodiments may reduce the amount of calculation of the diffraction fringe pattern information by adjusting the number of segments into which the original image is segmented.

The holographic 3D image displaying apparatuses and methods according to the exemplary embodiments are not limited to the configurations of the above exemplary embodiments, and all or part of exemplary embodiments may be selectively combined so that various modifications may be made in the above exemplary embodiments.

The holographic 3D image displaying apparatuses and methods according to one or more exemplary embodiments may be applied to various electronic apparatuses such as monitors, televisions (TVs), mobile display apparatuses, and mobile communication apparatuses.

The holographic 3D image displaying apparatuses and methods according to the exemplary embodiments may also be embodied as computer-readable codes on a computer-readable recording medium. The computer-readable recording medium may be any data storage device that may store data which may be thereafter read by a computer system. Examples of the computer-readable recording medium include read-only memories (ROMs), random-access memories (RAMs), compact disk read-only memories (CD- ROMs), magnetic tapes, floppy disks, optical data storage devices, and transmission media such as Internet transmission media. The computer-readable recording medium may also be distributed over network-coupled computer systems so that the computer-readable codes may be stored and executed in a distributed fashion.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An apparatus for displaying a holographic three-dimensional (3D) image, the apparatus comprising:
   a memory configured to store instructions; and
   a processor configured to execute the stored instructions to implement:
      an image segmenter configured to segment an original image of an object into a plurality of segments, and adjust a number of the segments per unit volume or the number of the segments per unit area according to a property of a light representing the original image;
      a calculator configured to calculate diffraction fringe pattern information for displaying each of the plurality of segments as a 3D holographic image; and
      a light modulator configured to form a diffraction fringe pattern according to the diffraction fringe pattern information and generate the 3D holographic image corresponding to the original image by modulating a light incident on the diffraction fringe pattern,
   wherein the image segmenter is further configured to pre-store information about a reference number of the segments related to a region of the original image represented by a light having a visible wavelength, and set the number of the segments per unit volume or the number of the segments per unit area in a region of the original image represented by a light having an invisible wavelength to be less than the reference number.

2. The apparatus of claim 1, wherein the image segmenter is further configured to adjust the number of the segments according to at least one selected from a shape of the object included in the original image and a position of the object included in the original image.

3. The apparatus of claim 2, wherein the property of the light representing the original image includes at least one selected from a brightness of the light and a wavelength of the light.

4. The apparatus of claim 1, wherein the image segmenter is further configured to segment the original image by using at least one selected from a mode of segmenting the original image into a plurality of layers according to a depth of the original image, a mode of segmenting the original image into a plurality of points, and a mode of segmenting a surface of the object included in the original image into a plurality of polygons.

5. The apparatus of claim 2, wherein the image segmenter includes information about a reference number of the segments according to a curvature radius of a surface of the object or a change rate of the curvature radius of the surface, and is configured to set the number of the segments per unit volume or the number of the segments per unit area in a region having a large curvature radius or a region having a small change rate of the curvature radius to be less than the reference number.

6. The apparatus of claim 2, wherein the image segmenter includes information about a reference thickness of the segments according to a curvature radius of a surface of the object or a change rate of the curvature radius of the surface, and is configured to segment the original image into a plurality of layers according to depth, and set a thickness of each of the plurality of layers in a region having a large curvature radius or a region having a small change rate of the curvature radius to be greater than the reference thickness.

7. The apparatus of claim 2, wherein the image segmenter includes information about a reference volume or a reference area of the segments according to a curvature radius of a surface of the object or a change rate of the curvature radius of the surface, and is configured to segment the original image into a plurality of points, and set a volume or an area covered by each of the plurality of points in a region having a large curvature radius or a region having a small change rate of the curvature radius to be greater than the reference volume or the reference area.

8. The apparatus of claim 2, wherein the image segmenter includes information about a reference area of the segments according to a curvature radius of a surface of the object or a change rate of the curvature radius of the surface, and is configured to segment the surface of the object into a plurality of polygons, and set an area of each of the plurality of polygons in a region having a large curvature radius or a region having a small change rate of the curvature radius to be greater than the reference area.

9. An apparatus for displaying a holographic three-dimensional (3D) image, the apparatus comprising:
   an image segmenter configured to segment an original image into a plurality of segments, and adjust a number of the segments per unit volume or the number of the segments per unit area;
   a calculator configured to calculate diffraction fringe pattern information for displaying each of the plurality of segments as a 3D holographic image; and
   a light modulator configured to form a diffraction fringe pattern according to the diffraction fringe pattern information and generate the 3D holographic image corresponding to the original image by modulating a light incident on the diffraction fringe pattern, wherein the image segmenter is further configured to pre-store information about a reference number of the segments related to a brightness of the original image, and is configured to set the number of the segments per unit volume or the number of the segments per unit area in a dark region of the original image to be less than the reference number.

10. An apparatus for displaying a holographic three-dimensional (3D) image, the apparatus comprising:
    an image segmenter configured to segment an original image into a plurality of segments, and adjust a number of the segments per unit volume or the number of the segments per unit area;
    a calculator configured to calculate diffraction fringe pattern information for displaying each of the plurality of segments as a 3D holographic image; and
    a light modulator configured to form a diffraction fringe pattern according to the diffraction fringe pattern information and generate the 3D holographic image corresponding to the original image by modulating a light incident on the diffraction fringe pattern, wherein the image segmenter is further configured to pre-store information about a reference number of the segments related to a visible region of the original image, and is configured to set the number of the segments per unit volume or the number of the segments per unit area in an invisible region of the original image to be less than the reference number in an invisible region of the original image.

11. The apparatus of claim 2, wherein the image segmenter includes information about a reference number of the segments according to a depth of the original image, and is configured to set the number of the segments per unit volume or the number of the segments per unit area in a deep region of the original image to be less than the reference number.

12. The apparatus of claim 4, wherein the image segmenter includes information about a reference thickness of the segments according to a depth of the original image, and is configured to segment the original image into a plurality of layers according to the depth, while setting a thickness of each of the plurality of layers in a deep region of the original image to be greater than the reference thickness.

13. A method for displaying a holographic three-dimensional (3D) image, the method comprising:
    segmenting an original image of an object into a plurality of segments, while adjusting a number of the segments per unit volume or the number of the segments per unit area according to a property of a light representing the original image;
    calculating diffraction fringe pattern information for displaying each of the plurality of segments as a 3D holographic image; and
    forming a diffraction fringe pattern according to the diffraction fringe pattern information and generating the 3D holographic image corresponding to the original image by modulating a light incident on the diffraction fringe pattern,
    wherein the segmenting of the original image comprises pre-storing information about a reference number of the segments related to a region of the original image represented by a light having a visible wavelength, and setting the number of the segments per unit volume or the number of the segments per unit area in a region of the original image represented by a light having an invisible wavelength to be less than the reference number.

14. The method of claim 13, wherein the segmenting of the original image further comprises adjusting the number of the segments according to at least one selected from a shape of the object included in the original image and a position of the object included in the original image.

15. The method of claim 14, wherein the property of the light representing the original image includes at least one selected from a brightness of the light and a wavelength of the light.

16. The method of claim 13, further comprising: segmenting the original image by using at least one selected from a mode of segmenting the original image into a plurality of layers according to depth, a mode of segmenting the original image into a plurality of points, and a mode of segmenting a surface of an object included in the original image into a plurality of polygons.

17. A method for displaying a holographic three-dimensional (3D) image, the method comprising:
    segmenting an original image into a plurality of segments, while adjusting a number of the segments per unit volume or the number of the segments per unit area according to a property of a light representing the original image;
    calculating diffraction fringe pattern information for displaying each of the plurality of segments as a 3D holographic image; and
    forming a diffraction fringe pattern according to the diffraction fringe pattern information and generating the 3D holographic image corresponding to the original image by modulating a light incident on the diffraction fringe pattern,
    wherein the segmenting of the original image comprises pre-storing information about a reference number of the segments related to a brightness of the original image, and
    setting the number of the segments per unit volume or the number of the segments per unit area in a dark region of the original image to be less than the reference number.

18. A method for displaying a holographic three-dimensional (3D) image, the method comprising:
    segmenting an original image into a plurality of segments, while adjusting a number of the segments per unit volume or the number of the segments per unit area according to a property of a light representing the original image;
    calculating diffraction fringe pattern information for displaying each of the plurality of segments as a 3D holographic image; and
    forming a diffraction fringe pattern according to the diffraction fringe pattern information and generating the 3D holographic image corresponding to the original image by modulating a light incident on the diffraction fringe pattern,
    wherein the segmenting of the original image comprises pre-storing information about a reference number of the segments related to a visible region of the original image, and setting the number of the segments per unit volume or the number of the segments per unit area in an invisible region of the original image to be less than the reference number.

* * * * *